United States Patent
Huang

(10) Patent No.: US 9,403,283 B2
(45) Date of Patent: Aug. 2, 2016

(54) CLAMPING AND CUTTING DEVICE FOR FROZEN MATERIAL

(75) Inventor: Chien-Feng Huang, Taipei Hsien (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 1888 days.

(21) Appl. No.: 12/649,352

(22) Filed: Dec. 30, 2009

(65) Prior Publication Data
US 2010/0282040 A1    Nov. 11, 2010

(30) Foreign Application Priority Data

May 5, 2009    (CN) .......................... 2009 1 0302103

(51) Int. Cl.
  *B26D 7/02*    (2006.01)
  *B29C 45/38*   (2006.01)
  *B26D 1/30*    (2006.01)
  *B65H 54/71*   (2006.01)
  *B23D 29/02*   (2006.01)

(52) U.S. Cl.
  CPC .. *B26D 7/02* (2013.01); *B26D 1/30* (2013.01); *B29C 45/382* (2013.01); *B23D 29/02* (2013.01); *B65H 54/71* (2013.01); *Y10S 425/051* (2013.01); *Y10T 83/5733* (2015.04); *Y10T 83/7487* (2015.04); *Y10T 83/7513* (2015.04)

(58) Field of Classification Search
  CPC ... A01G 2003/023; A01G 3/02; B23D 17/00; B23D 17/06; B23D 29/002; B23D 29/02; B23D 29/023; B26D 1/30; B26D 7/02; B26D 1/305; A01D 46/247; B26B 13/00; B26B 13/26; B29C 45/38; B29C 45/382; B65H 54/71; Y10S 425/051; Y10T 83/5669; Y10T 83/5733; Y10T 83/7487; Y10T 83/7493; Y10T 83/7513

USPC .............. 30/134, 135, 229; 83/456, 375, 452, 83/453
  See application file for complete search history.

(56) References Cited

U.S. PATENT DOCUMENTS

| | | | | |
|---|---|---|---|---|
| 253,252 | A * | 2/1882 | Badia | A01G 3/02 294/118 |
| 608,807 | A * | 8/1898 | Tilden | 30/134 |
| 633,736 | A * | 9/1899 | Schoonover | 30/134 |
| 1,012,918 | A * | 12/1911 | Roelants et al. | B23D 29/023 30/226 |
| 1,243,276 | A * | 10/1917 | Fisher | B23D 29/02 30/229 |
| 1,666,253 | A * | 4/1928 | Blincoe | A01G 3/02 30/135 |
| 3,302,287 | A * | 2/1967 | Kelly | 30/134 |
| 4,130,038 | A * | 12/1978 | Zehnder | 83/175 |
| 4,348,808 | A * | 9/1982 | Nalbandyan | 30/134 |
| 5,600,891 | A * | 2/1997 | Orgal | B26B 13/00 30/226 |
| 6,952,876 | B2 * | 10/2005 | Frazer | 30/123.3 |
| 8,007,268 | B2 * | 8/2011 | Huang | 425/315 |
| 2010/0291253 | A1 * | 11/2010 | Huang | 425/315 |

FOREIGN PATENT DOCUMENTS

GB    382067    * 10/1932 ............. B23D 29/02

* cited by examiner

*Primary Examiner* — Clark F Dexter
(74) *Attorney, Agent, or Firm* — ScienBiziP, P.C.

(57) ABSTRACT

A clamping and cutting device for frozen material includes a clamping member and a cutting component. The clamping member includes a clamper for clamping frozen materials and a driving component for driving the clamper to open or close. The cutting component is connected to the clamper and includes two driven arms cooperating with the clamper to open and close with the clamper.

4 Claims, 6 Drawing Sheets

CLAMPING AND CUTTING DEVICE FOR FROZEN MATERIAL

BACKGROUND

1. Technical Field

The present disclosure relates to a clamping and cutting device for frozen material.

2. Description of Related Art

When a frozen material is molded, a plurality of filaments will appear at the tail of the frozen material. A user must cut the filaments, and then clamp the frozen material, which is time consuming and inefficient.

Therefore, what is needed is a clamping and cutting device to overcome the shortcoming described.

DETAILED DESCRIPTION

Figure 1:
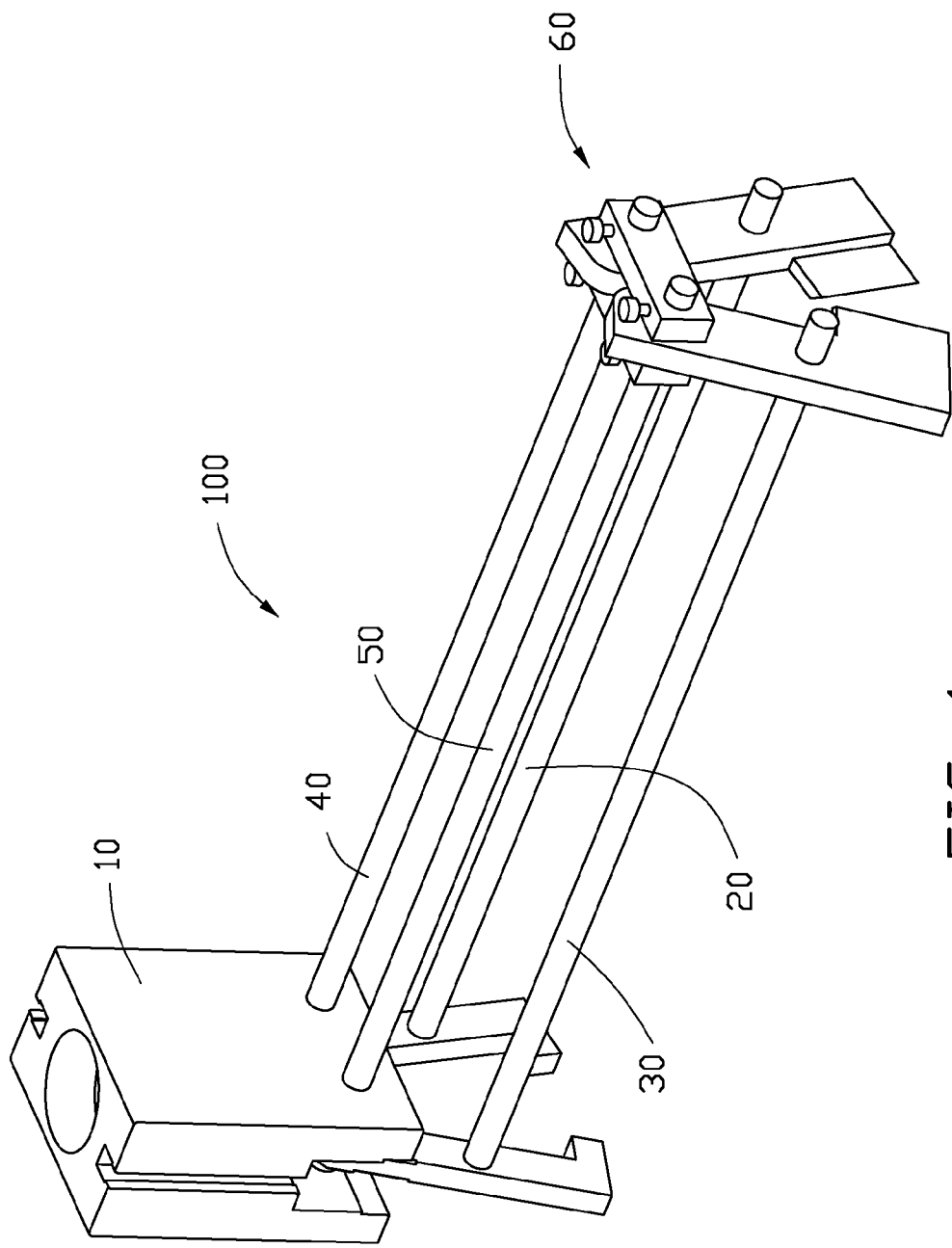
FIG. 1 is an isometric view of a clamping and cutting device for frozen material in accordance with an exemplary embodiment.
Figure 2:
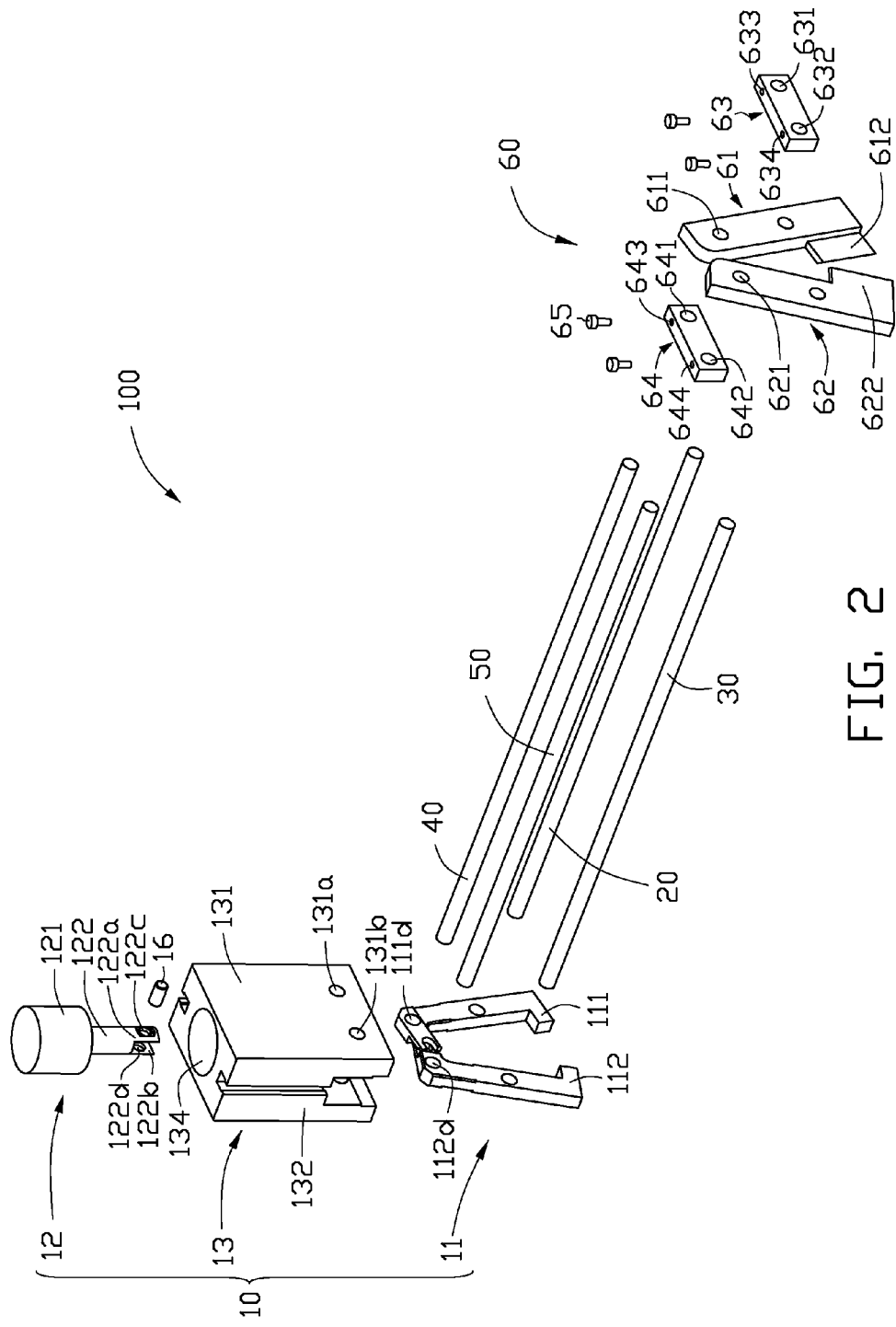
FIG. 2 is an exploded view of the clamping and cutting device for frozen material of FIG. 1.

Referring to FIGS. 1-2, a clamping and cutting device 100 for frozen material is provided. The clamping and cutting device 100 includes a clamping member 10, a first connection pole 20, a second connection pole 30, a first connection axle 40, a second connection axle 50, and a cutting component 60.

The clamping member 10 includes a clamper 11, a driving component 12, a fixing component 13 and a first bolt 16.

Figure 3:
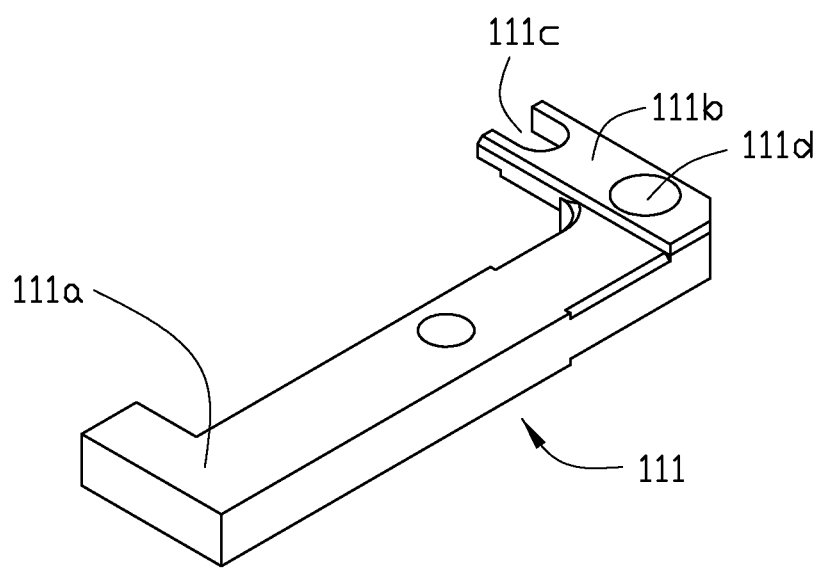
FIG. 3 is an enlarged view of a first holding arm of the clamping and cutting device for frozen material of FIG. 1.
Figure 4:
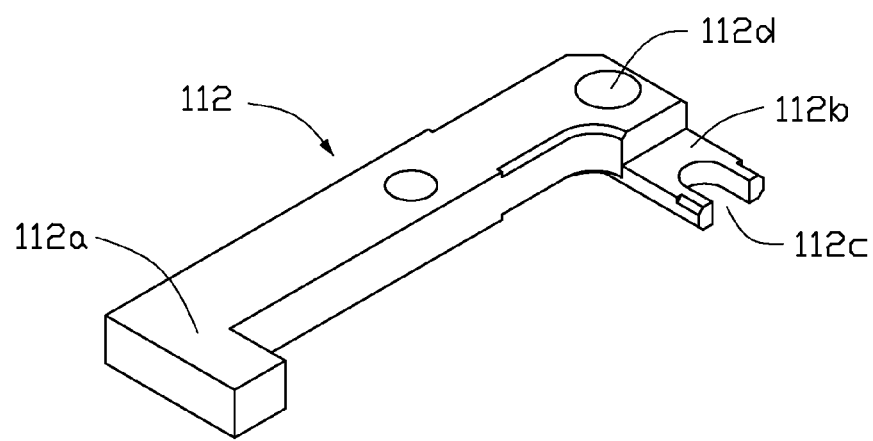
FIG. 4 is an enlarged view of a second holding arm of the clamping and cutting device for frozen material of FIG. 1.

Referring to FIGS. 3-4, the clamper 11 includes a first holding arm 111 and a second holding arm 112 cooperating with the first holding arm 111. The first holding arm 111 includes a first holding portion 111a and a first connection portion 111b. The second holding arm 112 includes a second holding portion 112a cooperating with the first holding portion 111a and a second connection portion 112b cooperating with the first connection portion 111b. A first U shaped hole 111c is defined in the first connection portion 111b, and a second U shaped hole 112c is defined in the second connection portion 112b and is symmetrical to the first U shaped hole 111c. A through hole 111d is defined in the first connection portion 111b, and is configured for passing through by the first connection axle 40. A second through hole 112d is defined in the second connection portion 112b, and is configured for passing through by the second connection axle 50.

The driving component 12 is configured for driving the clamper 11 to splay or fold, i.e., open or close. The driving component 12 includes a power source 121 and a driving axle 122 coupling with the power source 121. The driving axle 122 is movable to and fro along an axial direction by the power source 121. In the exemplary embodiment, the power source 121 may be a cylinder, or a piston, etc. A first extending portion 122a is vertically extended from one end of the driving axle 122, and a second extending portion 122b is also vertically extended from the one end of the driving axle 122 and is spaced from and aligned with the first extending portion 122a. A first threaded hole 122c is defined in the first extending portion 122a, and a second threaded hole 122d is defined in the second extending portion 122b and is aligned with the first threaded hole 122c. The first bolt 16 is extended through the first threaded hole 122c and the second threaded hole 122d of the driving axle 122 in turn, and is screwed with the nut (not shown), and the first U shaped hole 111c is engaged with the portion of the first bolt 16, and the second U shaped hole 112c is also engaged with the portion of the first bolt 16, so that, the first holding arm 111 and the second holding arm 112 are movably connected to the driving axle 122.

Figure 5:
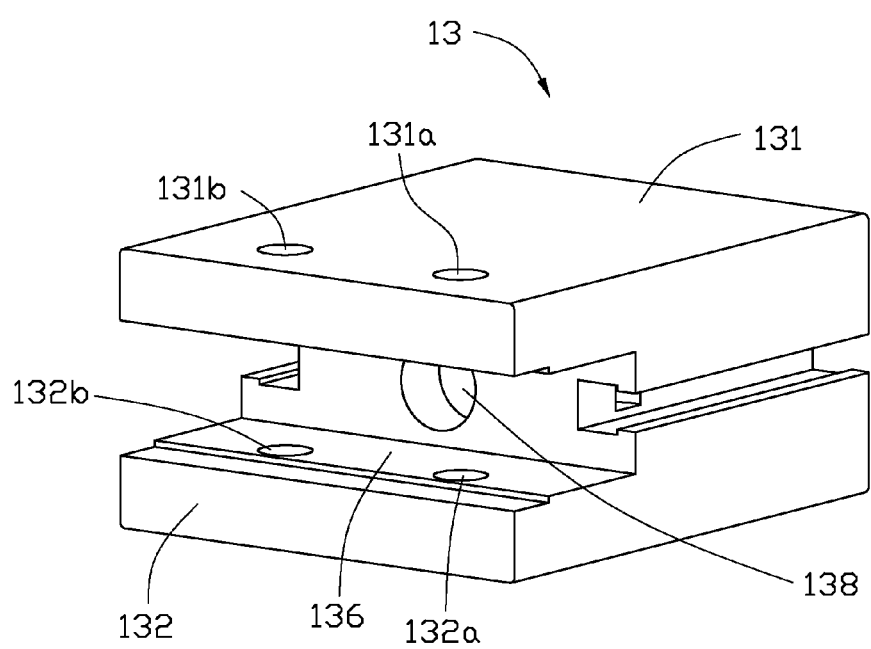
FIG. 5 is an enlarged view of a fixing component of the clamping and cutting device for frozen material of FIG. 1.

Referring to FIGS. 2 and 5, the fixing component 13 includes a first board 131 and a second board 132 symmetrical to the first board 131. A first fixed hole 131a and a second fixed hole 131b are defined in the first board 131, and a third fixed hole 132a and a fourth fixed hole 132b are defined in the second board 132. The third fixed hole 132a is aligned with the first fixed hole 131a and the fourth fixed hole 132b is aligned with the second fixed hole 131b. A first receiving space 134, a second receiving space 136 and a connection hole 138 connecting the first receiving space 134 to the second receiving space 136 are formed between respective outer faces of the first board 131 and the second board 132. The power source 121 is received in the first receiving space 134, and the driving axle 122 is passed through the connection hole 138 and is movably connected with the first holding arm 111 and the second holding arm 112, so that, the first holding arm 111 and the second holding arm 112 are received in the second receiving space 136.

When assembling the clamping member 10, firstly, the first bolt 16 is extended through the first threaded hole 122c and the second threaded hole 122d, and is screwed with the nut, the driving axle 122 is passed through the connection hole 138, and the power source 121 is received in the first receiving space 134. Secondly, the first U shaped hole 111c and the second U shaped hole 112c are engaged with the first bolt 16 respectively, so that, the first holding arm 111 and the second holding arm 112 are movably connected to the driving component 12. Finally, the first holding arm 111 and the second holding arm 112 are received in the second receiving space 136.

The cutting component 60 includes a first driven arm 61, a second driven arm 62, a first limitation block 63, a second limitation block 64 and a second bolt 65.

A first reamer member 612 is formed in the first driven arm 61, and a second reamer member 622 cooperating with the first reamer member 612 is formed in the second driven arm 62. The first reamer member 612 and the second reamer member 622 are made of the wear-resistant material.

One end of the connection pole 20 is fixed to the first holding arm 111, and another end of the connection pole 20 is fixed to the first driven arm 61. One end of the second connection pole 30 is fixed to the second holding arm 112, and another end of the second connection pole 30 is fixed to the second driven arm 62. A third through hole 611 is defined in the first driven arm 61. A fourth through hole 621 is defined in the second driven arm 621.

The first limitation block 63 is set on one side of the first 61 and second 62 driven arms, and the second limitation block 64 is set on the other side of the first 61 and second 62 driven arms. Detailedly, a fifth through hole 631, a sixth through hole 632, a first threaded hole 633 and a second threaded hole 634 are defined in the first limitation block 63. A seventh through hole 641, an eighth through hole 642, a third threaded hole 643 and a fourth threaded hole 644 are defined in the second limitation block 64. The axial direction of the fifth through hole 631 and the sixth through hole 632 is vertical to the axial direction of the first threaded hole 633 and the second threaded hole 634, and the axial direction of the seventh through hole 641 and the eighth through hole 642 is vertical to the axial direction of the third threaded hole 643 and the fourth threaded hole 644. One end of the first connection axle 40 is passed through the first fixed hole 131a, the first through hole 111d and the third fixed hole 132a, in turn, and another end of the first connection axle 40 is passed through the seventh through hole 641, the third through hole 611 and the fifth through hole 631, in turn. The first connection axle 40 cooperates with the first fixed hole 131a and the third fixed hole 132a.

One end of the second connection axle 50 is passed through the second fixed hole 131b, the second through hole 112d and the fourth fixed hole 132b, in turn, and another end of the connection axle 50 is passed through the eighth through hole 642, the fourth through hole 621 and the sixth through hole 632, in turn. The second connection axle 50 cooperates with the second fixed hole 131b and the fourth fixed hole 132b. Each of the four second bolts 65 is screwed with the first threaded hole 633, the second threaded hole 634, the third threaded hole 643 and the fourth threaded hole 644, respectively, and is respectively resisted by the first connection axle 40 and the second connection axle 50, thereby limiting a position of the first driven arm 61 and the second driven arm 62 relative to the clamping member 10.

Figure 6:
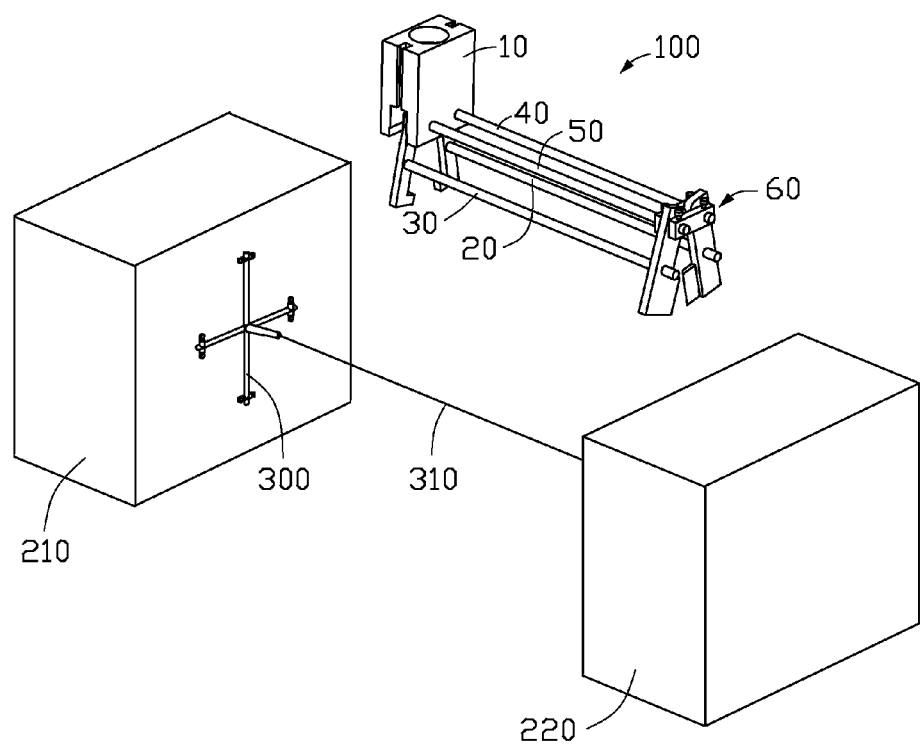
FIG. 6 is a view, in use, of the clamping and cutting device for frozen material of FIG. 1.

Referring to FIG. 6, the cutting member 60 is set to the edge of the female mold 220 so that the cutting member 60 can cut more filaments 310. When the frozen material 300 is molded, the male mold 210 and the female mold 220 are separated, the filaments 310 appear at the tail of the frozen material 300. The user starts the frozen material clamping device 100, and when clamping the frozen material 300, the driving component 12 drives the first holding arm 111 and the second holding arm 112 to fold, and the first holding arm 111 drives the first driven arm 61 of the cutting member 111 to move, and the second holding arm 112 drives the second driven arm 62 of the cutting member 60 to move, and when the first holding arm 111 and the second holding arm 112 clamp the frozen material 300, the first reamer member 612 and the second reamer member 622 cut the filaments 310, so that, the frozen material 300 is clamped and the filaments 310 are cut.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A clamping and cutting device for a frozen material comprising:
    a clamping member comprising:
        a clamper configured for clamping a frozen material and comprising two holding arms, and
        a driving component operably connected to the two holding arms for driving the two holding arms to cause the clamper to open or close;
    two connection axles;
    a cutting component for cutting the frozen material, the cutting component connected to the clamper by the two connection axles and comprising two driven arms, which cooperate with the clamper, and two limitation blocks, each limitation block placed on the two connection axles and located on a respective side of the two driven arms,
    wherein one end of each of the two connection axles is fixed to a respective one of the holding arms, the other end of each of the two connection axles is connected to a respective one of the driven arms, and the two limitation blocks are slidable along a length of each of the two connection axles, each connection axle defining a pivot axis about which the respective connection arm and the respective holding arm pivots; and
    two connection poles, wherein the cutting component is further connected to the clamper by the two connection poles, one end of each of the two connection poles is fixed to a respective one of the holding arms, and the other end of each of the two connection poles is fixed to a respective one of the driven arms.

2. The clamping and cutting device for a frozen material as described in claim 1, wherein the driving component comprises a power source and a driving axle coupling with the power source, and the driving axle is movable to and fro along an axial direction by the power source to drive the two holding arms to open or close.

3. The clamping and cutting device for a frozen material as described in claim 2, wherein the clamping member further comprises a fixing component, the fixing component comprising a first board and a second board symmetrical to the first board, the fixing component further comprising a first receiving space, a second receiving space and a connection hole connecting the first receiving space to the second receiving space, wherein the first receiving space, the second receiving space and the connection hole are formed between respective outer faces of the first board and the second board, and wherein the power source is received in the first receiving space, and the driving axle is passed through the connection hole and is movably connected to the clamper.

4. The clamping and cutting device for a frozen material as described in claim 1, wherein the cutting component comprises two reamer members formed disposed on the two driven arms, respectively, for cutting filaments of the frozen material.

* * * * *